Nov. 12, 1946.                R. N. WALLACH                2,411,012
                             CONTAINER CLOSURE
                            Filed Dec. 30, 1941
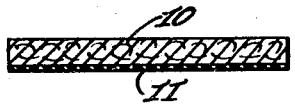
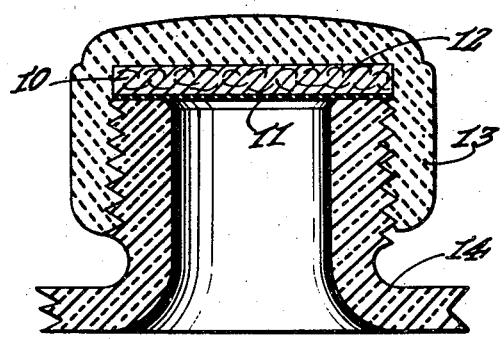
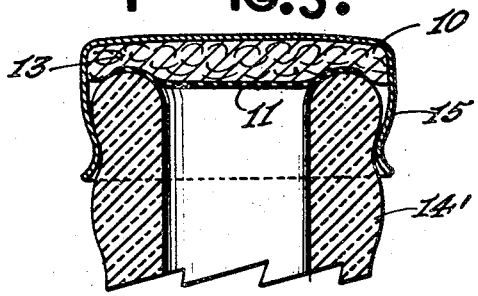
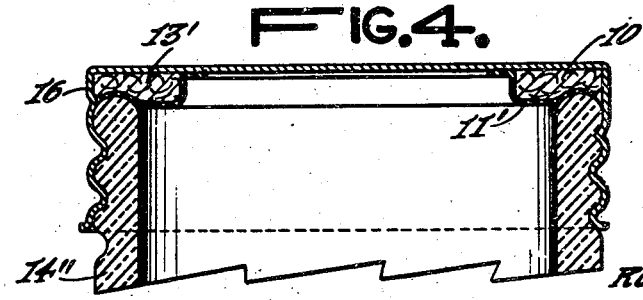
INVENTOR.
ROGER N. WALLACH.
BY
Worth Wade
ATTORNEY.

Patented Nov. 12, 1946

2,411,012

UNITED STATES PATENT OFFICE 2,411,012

CONTAINER CLOSURE

Roger N. Wallach, Briarcliff Manor, N. Y., assignor, by mesne assignments, to American Viscose Corporation, Wilmington, Del., a corporation of Delaware Application December 30, 1941, Serial No. 424,849

10 Claims. (Cl. 215—40)

This invention relates in general to container closures, and in particular to a closure for containers adapted to hold liquids and to correlated improvements designed to enhance the properties and extend the utility of such closures.

Closures for liquid containers, such as cork caps and compression caps, have heretofore been provided on the inside with a gasket formed of a layer of cork, which material being resilient and compressible, forms a liquid tight seal. Cork as a gasket material has another important property in that it is normally insoluble and does not react with water, alcoholic beverages, fruit juices or many other liquid materials. Owing to the scarcity of cork, however, many attempts have been made to provide a resilient, compressible gasket of other materials as a substitute for cork, but the substitutes heretofore proposed have been lacking in one or more of the essential characteristics required in such gaskets.

It is a general object of the present invention to provide a gasket to replace cork in bottle closures.

It is another object of the invention to provide a resilient compressible gasket for liquid container closures which gasket will be inert, insoluble and non-contaminating when in contact with liquids held in the containers.

A specific object of the invention is to provide a bottle closure having a resilient, compressible, inert gasket which is adapted to form a liquid tight seal for the bottle.

Other objects of the invention will in part be obvious and will in part appear hereinafter.

According to the present invention, there is provided a container closure having a resilient, compressible gasket on the inside, adapted to forming a liquid tight seal, which gasket comprises a layer of fibrous material, some fibers of which are adapted to swell in the liquid which is held in the container, and a thin film of waterproof but vapor permeable material extending over the surface of the layer which is next to the liquid, said film being permeable to the vapors of the liquid held in the container, whereby the vapors which penetrate the film cause the fibers to swell thus increasing the pressure of the gasket and thus forming a liquid tight seal.

The invention accordingly comprises an article having features, characteristics and limits as hereinafter described, and the scope of the application of which will be indicated in the claims.

For a more complete understanding of the nature and objects of the present invention, reference should be made to the accompanying drawing in which Figure 1 is a cross-section view of one embodiment of the gasket of the invention, Figure 2 is a side elevation in section of a container closure of the screw cap type being one embodiment of the gasket of the invention, Figure 3 is a side elevation in section of another embodiment of the container closure of the invention in which the closure is a compression cap.

Figure 4 is a side elevation in section of a third embodiment of the closure of the invention.

As will be noted from the accompanying drawing the invention is not limited to any particular type of closure. The closures in which the novel gasket of the present invention may be employed comprise screw caps formed of metal, glass, resins, gelatin and the like, and compression caps formed of metal, fiber-board and other resilient materials, as well as screw caps of the type used on wide mouth bottles such as that shown in Figure 4. The closures of the present invention are adapted to be used on liquid containers of all types including bottles and cans such as cans for beer and other alcoholic beverages, or for aqueous liquids of all types including fruit juices, syrups, olive oil, salad dressing, tomato juice and the like.

Referring to Figure 1, in its simplest embodiment th closure of the present invention comprises a gasket or cushion disposed on the inside between the cap and the mouth of the bottle. This gasket or cushion is formed of layer 10 formed of fibrous material formed in whole or in part of fibers which are of a type which will swell in the liquid to be held in the container to which the closure is applied. The fibrous layer 10 may be a felt, paper or fabric formed in whole or in part of such swellable fibers, but in the now preferred embodiment, the layer 10 comprises a felt formed in major proportion of swellable fibers and in minor proportion of potentially adhesive fibers, the potentially adhesive fibers being rendered adhesive at some point in the manufacture of the felt in order to bind the fibers into the felt. Felts of this type may be formed of a mixture of soluble fibers and thermoplastic synthetic resin fibers according to the copending application of Carleton S. Francis, Jr., Serial No. 300,876 filed October 23, 1939, in which application there is disclosed a process of mixing together normally non-adhesive fibers (the swellable fibers of the present invention) with thermoplastic synthetic resin fibers, and heating the mixture of fibers to a temperature at which the resin fibers become tacky and thereafter cooling the felt to cause the fibers to adhere to each other.

In the formation of the fibrous layer 10 used in the gasket of the present invention, the swellable fibers are obviously selected with regard to the nature of the liquid to be held in the container. For example, if the liquid is water or an aqueous solution, including alcoholic beverages, the swellable fibers may comprise any hydrophilic fibrous materials as a class, such for example as fibers formed of regenerated cellulose or cellulose hydrate, water swelling low esterified cellulose esters, water soluble and alkali soluble cellulose ethers including cellulose hydroxy alkyl ethers, cellulose carboxy alkyl ethers, cellulose ether xanthate, cellulose xantho fatty acids, cellulose thiosulfonyl water swelling synthetic resins, and fibers formed of alginic acid, gelatin, casein and the like. If the liquid held in the container is an organic liquid, i. e. non-aqueous, the swellable fibers used in the gasket of the present invention may comprise any hydrophobic fibrous materials as a class, such for example as fibers formed of organic solvent-soluble cellulose esters, cellulose ethers including benzyl cellulose, natural and synthetic resin fibers, fibers formed of rubber, synthetic rubber or rubber substitutes, as well as fibers formed of a mixture of two or more of the hydrophobic substances just mentioned.

In a now preferred embodiment of the present invention, the fibrous layer 10 is formed of a mixture of hydrophilic fibers and hydrophobic fibers so that the closure former therewith is adapted for universal use on containers holding either aqueous or non-aqueous liquids, since the hydrophilic fibers will swell when the closure is used on aqueous liquids and the hydrophobic fibers will swell when used on containers for organic liquids. Further, in this embodiment where the fibrous layer 10 is formed of a mixture of fibers, at least one of the types of fibers is rendered adhesive at some point in the manufacture of the fibrous layer so that the fibers in the layer are bound together and fixed in position so that the swelling of the fibers does not result in the loss of the form of the fibrous layer.

Referring to Figure 1, the gasket of the invention also comprises on the underside, which is adjacent to liquid, the film 11 formed of a water impervious but vapor pervious material. The layer 11 may be a coating applied to the fibrous layer 10 or it may be a self-supporting film or foil of suitable material laminated to the fibrous layer 10. In one embodiment of the present invention, the film is formed by the substantially complete coalescence of some of the fibers of which the layer 10 is composed. Such a film may be formed by the use of a fibrous layer 10 which comprises fibers capable of being dissolved or softened by heat and pressure, and then applying a suitable solvent to cause the fibers to form a plastic material and flow into a substantially continuous film. For example, if part or all of the fibers of the layer 10 are formed of alkali soluble cellulose ether, such fibers may be moistened with dilute alkali of sufficient concentration to render the fibers partly soluble, and the fiber layer is then pressed and heated to coagulate the dissolved cellulose ether in the form of a continuous film. If the felt is heated on the under side only, the film will form on that side preferentially. On the other hand, when layer 10 comprises organic soluble, thermoplastic fibers, the fibers may be moistened with the appropriate organic solvent and heated to form a continuous surface film.

As an alternative, the film 11 may be formed by spraying one surface of the layer 10 with a solution of a film forming, water-proof, vapor permeable material such as a solution in an organic solvent of a synthetic resin, or an organic solvent soluble cellulose derivative, and thereafter evaporating the solvent to leave a substantially continuous surface film.

In a third embodiment, the film 11 may be formed by taking a self-supporting continuous foil formed of a water-proof, vapor permeable material such as a resin or cellulose derivative, and laminating such foil to the fibrous layer 10 by means of heat and pressure with or without the use of a solvent or by the use of a suitable adhesive.

It is to be understood that the film 11 may extend over a part or all of the under surface of the fibrous layer 10, but in the now preferred embodiment, the film 11 extends over the entire surface of the layer which is exposed to the liquid, but it need not extend over that portion of the layer 10 which is merely in contact with the glass or metal parts of the container opening.

Referring to Figure 2, there is shown one embodiment of the closure in which the gasket designated generally as 12, is positioned on the inside of a screw cap 13. When such a cap is screwed on a container such as the bottle 14, the gasket effectively forms a liquid tight seal between the cap 13 and the mouth of the bottle.

Referring to Figure 3, there is shown another embodiment of the container closure in which the closure is a compression cap, i. e. a cap having a flared skirt such as the caps used on bottles of ginger ale and other soft drinks. In this embodiment the gasket 13 is disposed between the compression cap 15 and the top of the bottle 14'. In the embodiment of the cap shown in Figure 3, the film 11 of the gasket 13 need not extend over that portion of the fibrous layer 10 which is solely in contact with the glass top of the bottle. That is, the film 11 extends merely over that portion of the fibrous layer 10 which would be in direct contact with the liquid when the bottle is inverted.

In that embodiment shown in Figure 4 there is shown a metal screw cap 16 of the type used on wide mouth bottles. The gasket 13' in this embodiment is merely an annular ring disposed inside the cap between the cap and the mouth of the bottle 14'. In other words, gasket 13' is merely a ring so that the central portion of the under side of the metal cap is not covered by the gasket. In this embodiment the water-proof, vapor permeable film 11' of the gasket preferably extends not only across the lower surface of the fibrous layer 10, but also over the exposed edge of the layer 10 and also over a portion of the under side of the metal cap so that the layer 10 is completely enclosed against direct contact with the liquid held in the container.

It is to be understood however that various embodiments of the gasket and closure may be made in accordance with the principles of the present invention. The invention contemplates that the layer 10 may be adhesively united to the under side of the cap either by the use of a separate film of adhesive or as a result of the rendering of some of the fibrous material adhesive while the layer is held under pressure against the inside of the cap, or as a result of the adhesive properties of the film 11 applied to the upper surface of the layer 10. It is also to be understood that where the fibers comprising the layer 10 are inert and insoluble, although swellable, in the liquid held in the container, the film 11 need not cover the ends of the layer 10.

The gasket of the present invention functions in a manner different from that of any gasket for containers heretofore provided in that the layer 10 comprises fibers which are swellable in the liquid held in the container and the film 11, which protects the layer 10 from actual contact with the liquid, is liquid-proof but is permeable to the vapors of the liquid held in the container. Thus when the closure is applied, the vapors of the liquid in the containers will pass through the film 11 and swell the fibers in the layer 10 thus increasing the pressure afforded by the gasket and thereby providing a liquid tight seal. The permeability of the film 11 to the particular liquid may be readily adjusted and varied as desired by varying the thickness of the film 11, by varying the composition of the film 11, or by purposely making the film 11 sufficiently discontinuous to enable the liquid to slowly seep through the film.

By way of illustrating but not by way of limiting the present invention, there will be given the following specific example.

A felt is formed of a mixture of 50% viscose rayon fibers and 50% of fibers formed of a copolymer of vinyl acetate and vinyl chloride, and the felt subjected to pressure and a temperature of 250° F., whereupon the vinyl resin fibers become adhesive and adhere to the other fibers. The layer of fibers thus formed is then laminated on one side to a thin film formed of a copolymer of vinyl acetate and vinyl halide also by the use of heat and pressure, the thickness of the film being just sufficient to prevent the passage of liquid but to permit the passage of substantial quantities of water vapor or alcohol vapor. The layer so produced is then cut into disks of suitable dimensions and inserted in the inside of a compression cap, using a drop of a vinyl resin adhesive to secure the uncoated side of the fibrous layer to the inside of the cap. When such a cap is applied to a bottle of ginger ale or alcoholic beverage, the water vapor in the container will pass slowly through the vinyl resin film and cause the rayon fibers to swell, thus increasing the pressure of the gasket and affording a resilient liquid tight seal.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent is:

1. A liquid-container closure having therein a liner in the form of a sealing gasket the body of which comprises a felted layer of regenerated cellulose fibers which will swell in the liquid held in the container.

2. A liquid-container closure having therein a sealing gasket comprising a mixture of artificial fibers, said fibers comprising fibers which will swell in the liquid held in the container and other fibers which are inert to said liquid, said other fibers adhering to swellable fibers to bind them and fix them in position in a resilient, compressible fibrous structure which does not suffer loss of form as a result of swelling of the swellable fibers.

3. A liquid-container closure having therein a liner in the form of a sealing gasket the body of which comprises a felted layer of regenerated cellulose fibers which will swell in the liquid held in the container, the exposed surface of the fibrous material being covered with a layer of liquid-proof material which is permeable to the vapor of said liquid.

4. A liquid-container closure having therein a sealing gasket comprising a mixture of artificial fibers, said fibers comprising fibers which will swell in the liquid held in the container and other fibers which are inert to said liquid, said other fibers adhering to swellable fibers to bind them and fix them in position in a resilient, compressible fibrous structure which does not suffer loss of form as a result of swelling of the swellable fibers, and a film united to the exposed surface of said gasket, said film being liquid-proof but permeable to the vapor of the liquid held in the container.

5. A liquid container closure having therein a sealing gasket comprising a resilient compressible felt-like product formed from a mixture of potentially adhesive fibers and normally non-adhesive fibers, the fibers being bonded to each other due to the adhesive action of the potentially adhesive fibers, at least one of said classes of fibers being swellable by the liquid held in the container.

6. A liquid container closure in accordance with claim 5, in which at least one of said classes of fibers is hydrophilic.

7. A liquid container closure in accordance with claim 5, in which at least one of said classes of fibers is hydrophobic.

8. A liquid container closure in accordance with claim 5 having on an exposed surface a film permeable to the vapor of said liquid.

9. A liquid container closure in accordance with claim 5 having on an exposed surface a film integral with and comprising a continuous coalescence of said potentially adhesive fibers.

10. A liquid container closure in accordance with claim 5 having united to an exposed surface a preformed film permeable to the vapor of said liquid.

ROGER N. WALLACH.